United States Patent [19]

Roberts

[11] 3,872,893

[45] Mar. 25, 1975

[54] SELF-REINFORCED PLASTIC HOSE AND METHOD FOR MOLDING SAME

[75] Inventor: Robert E. Roberts, Wilton, Conn.

[73] Assignee: Fred T. Roberts & Company, Wilton, Conn.

[22] Filed: Feb. 7, 1974

[21] Appl. No.: 440,458

Related U.S. Application Data

[63] Continuation of Ser. Nos. 248,932, May 1, 1972, abandoned, and Ser. No. 41,796, June 1, 1970, abandoned.

[52] U.S. Cl. ............... 138/121, 138/129, 264/99, 264/173, 264/209, 264/290, 264/314, 264/DIG. 52
[51] Int. Cl. .................. B29c 17/07, F16l 11/08
[58] Field of Search ........... 264/89, 90, 92, 93, 94, 264/98, 99, 173, 209, 286, DIG. 52, 290, 264/151, 314, 322; 138/121, 122, 140, 138/153, 173, 129; 156/205–209; 161/119; 425/387, 387 B, 326, 326 B, 425/388

[56] References Cited
UNITED STATES PATENTS

| | | | |
|---|---|---|---|
| 2,897,840 | 8/1959 | Roberts et al. .................. | 264/94 X |
| 3,235,440 | 2/1966 | Gould ............................ | 156/209 X |
| 3,256,131 | 6/1966 | Koch et al. ..................... | 161/119 |
| 3,510,388 | 5/1970 | Hunt et al. ..................... | 161/119 |

Primary Examiner—Jan H. Silbaugh
Attorney, Agent, or Firm—Thomas L. Tully; Arthur A. Johnson

[57] ABSTRACT

The hose of the present invention comprises an all plastic multilayer hose having a reinforcement therein which is of a material which is flexible and stiff under normal working conditions and which has a flow temperature less than the flow temperature of the cover and liner layers and which forms spaced reinforcing elements incident to the manufacture of the hose. The present invention contemplates use of an apparatus and simplified method which permits the reinforced hose to be readily manufactured in predetermined lengths or continuously so as to provide a hose of indefinite lengths.

7 Claims, 9 Drawing Figures

PATENTED MAR 25 1975 3,872,893

INVENTOR.
Robert E. Roberts
BY
Johnson and Kline
ATTORNEYS

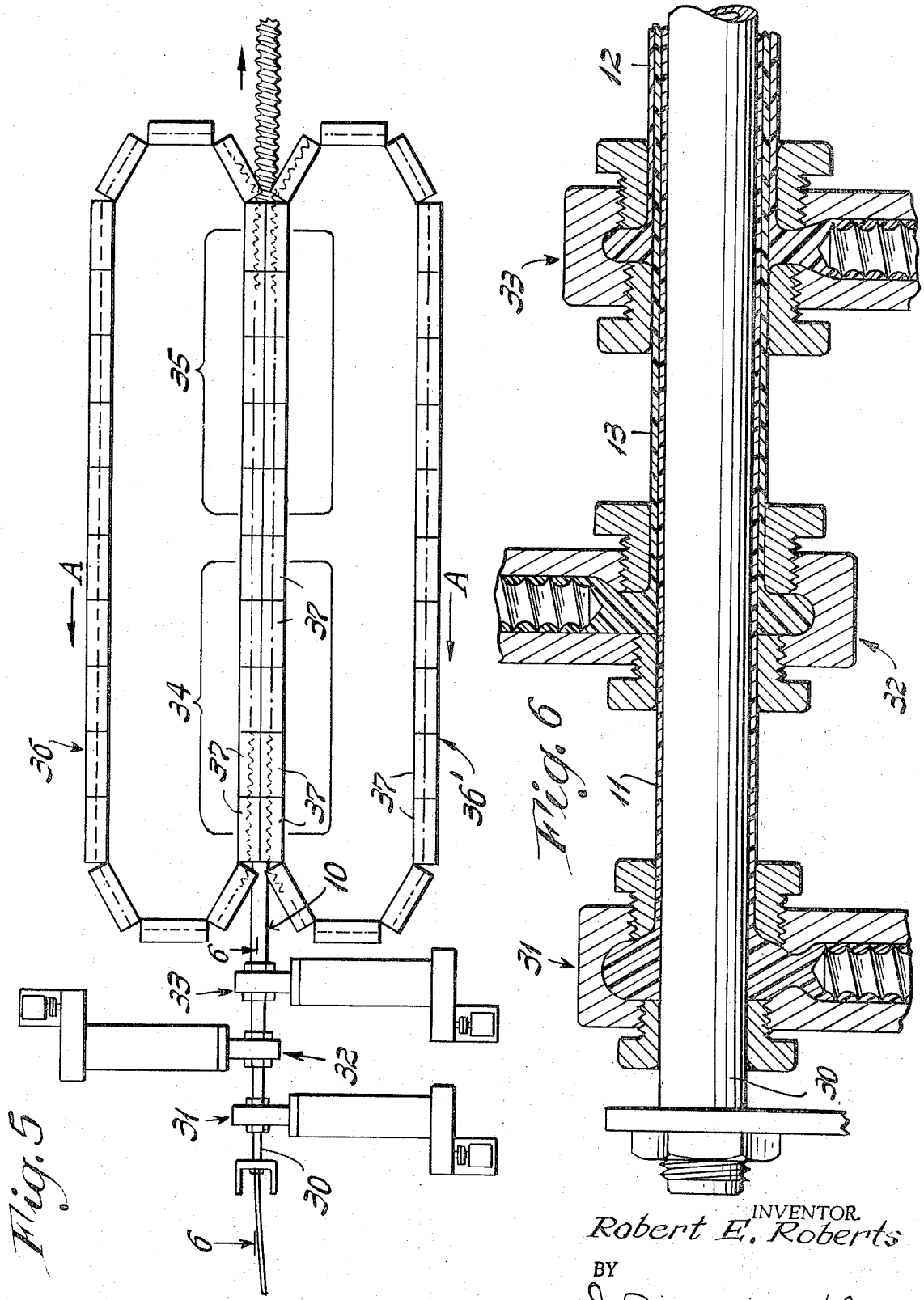

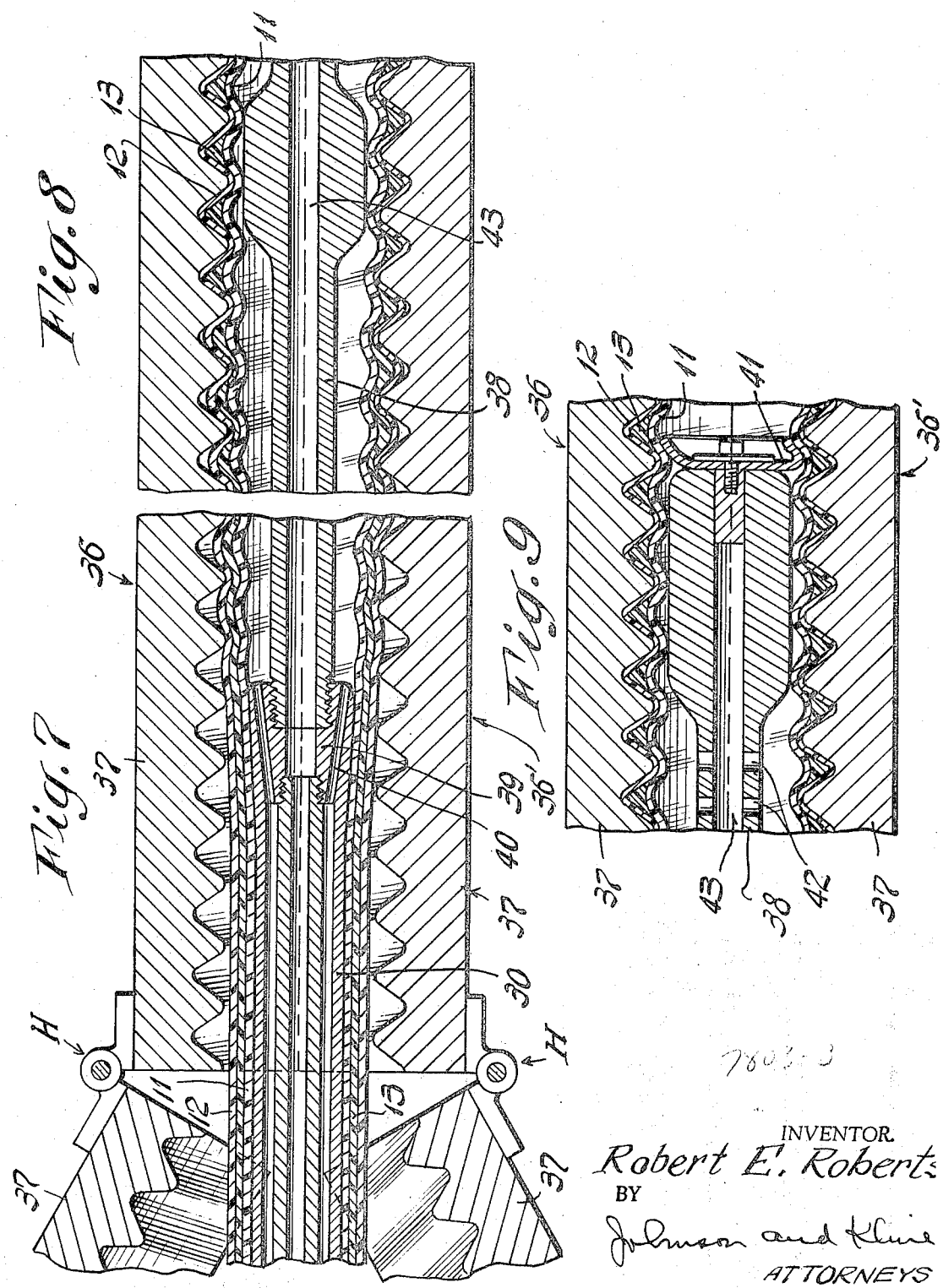

SELF-REINFORCED PLASTIC HOSE AND METHOD FOR MOLDING SAME

This is a continuation of applications Ser. Nos. 248,932, filed May 1, 1972, and 41,796, filed June 1, 1970, both now abandoned.

Heretofore, flexible hose was made by incorporating a wire spring coil reinforcement between the cover and liner layers. This wire spring had to be prefabricated and assembled with the liner layers and cover layers is predetermined spaced relation so as to provide spaced reinforcements. This normally was used to provide hose of predetermined lengths due to the limitations in connection with the forming of the reinforcing spring and the placing of the spring in the hose.

The present invention overcomes these difficulties by providing a simplified method and apparatus for producing a hose construction in which the hose is formed of an all plastic material and has a reinforcement which is formed in predetermined spaced relation within the hose as an incident to the manufacture of the hose so that hose of predetermined lengths or indefinite lengths can be readily manufactured.

This is accomplished by providing a tube of elastomeric material, said tube having at least a cover layer and a liner layer with an intermediate layer of thermoflowable reinforcing material. The tube is assembled in the corrugated cavities of a heated mold and is of such a character that the reinforcing layer has a flow point or temperature less than the flow temperature of the cover and liner layers, and, when heated in a mold to a temperature which is above the flow temperature of the reinforcing layer and below the flow temperatures of the cover and liner layers and pressed against the corrugated mold, will cause the reinforcing layer to flow into the corrugations of the mold and the cover and liner layers adhere together adjacent the crests of the corrugations of the mold, thus producing spaced reinforcements accurately located along the hose. The hose is set in molded form and removed from the mold.

In accordance with the present invention the tube can be made in a triple extruder in which the three layers are superposed to form the tube which is inserted into a suitable mold to ultimately mold the hose.

By the novel method of the present invention, the all plastic hose having spaced reinforcements is formed as an incident to and in a single molding operation, thus greatly reducing the cost of making the hose and increasing the accuracy of the reinforcement.

Other features and advantages of the invention will be apparent from the specification and claims when considered in connection with the accompanying drawings in which:

Figure 1:
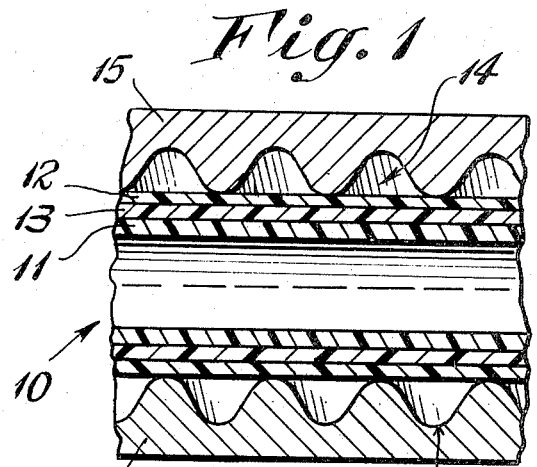
FIG. 1 is a fragmentary sectional view showing the tube inserted in a mold.
Figure 2:
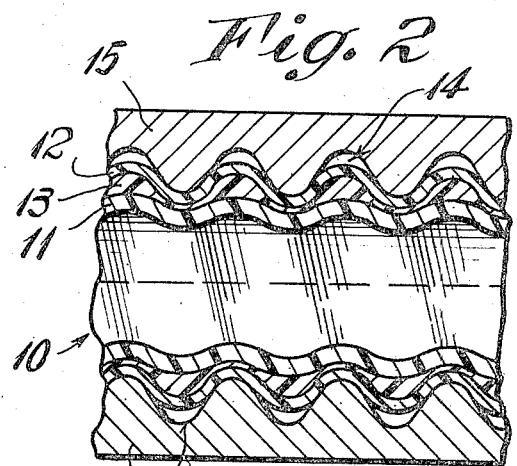
FIG. 2 is a view similar to FIG. 1 with internal pressure on the tube starting the flow of the heated reinforcing layer.

FIG. 5 diagrammatically shows the apparatus for making continuous hose.

FIG. 6 is a sectional view through the extruder heads taken along line 6—6 of FIG. 5.

FIGS. 7 and 8 are fragmentary sectional views of the molds at the left end of the machine of FIG. 5 receiving and molding the tube into a hose.

FIG. 9 is a fragmentary sectional view of the end of the fixed mandrel at the end of the molding operation.

The hose of the present invention comprises an all plastic, flexible, molded, corrugated hose of elastomeric material which includes a tube 10 or tubular member which incudes at least three elements—an inner layer 11, an outer or cover layer 12 and a reinforcing layer 13, which reinforcing layer comprises spaced resilient stiff reinforcements for the hose disposed between the inner layer and cover layer. These materials can be thermosetting, thermoplastic or combinations of said materials provided said materials are compatible and the flow point of the reinforcing material, i.e., a temperature at which the material of the reinforcing layer readily flows under molding pressure, is substantially lower than the flow point of the inner and cover layers, and the material of the reinforcements being such that it is stiff and resilient in normal operating temperatures of the hose. Should additional protective layers be required for the inner layer or cover layer, this can be applied without changing the present invention.

In an example of the present invention a tube would have an inner layer and a cover layer of flexible grades of polyvinyl chloride having a flow point of 385° and a reinforcing layer of polyvinyl chloride of a relatively rigid grade having a flow point of 350°. (All temperatures noted herein are in degrees Fahrenheit). The tube is molded at a temperature above the flow point of the reinforcing layer and below the flow point of the inner and outer layers, at about 370°. At this temperature the inner and cover layers stretch to conform to the mold and the reinforcing layers becomes flowable and flows into the corrugations in the mold to produce between the inner and cover layers accurately spaced and uniform reinforcing elements which are resilient and stiff at temperatures of normal use for the hose.

In another example the reinforcing layer could be of a reclaimed rubber which, when set up, has a Shore hardness of about 70 or more, and the inner layer could be of neoprene and the cover layer could be of butyl or neoprene which, when set up, have a Shore hardness of about 50 and the materials of each layer comply with the flow point requirements for said layer. The molding temperature would be between the flow point for the layers. Other combinations showing flow points and molding temperatures are as follows:

| Outer Layer | Reinforcing Layer | Inner Layer | Molding Temp. |
| --- | --- | --- | --- |
| Polyethylene 400° | Polystyrene 350° | Chlorinated polyester 430° | 375° |
| Polyethylene 550° | Polypropylene 470° | Polyethylene 550° | 500° |
| Polyethylene 450° | ABS 400° | Polyethylene 450° | 425° |
| PVC 385° | Nylon 347° | PVC 385° | 360° |
| Chlorinated polyester 390° | PVC 350° | Styrene butadiene 400° | 375° |

— Continued

| Outer Layer | Reinforcing Layer | Inner Layer | Molding Temp. |
| --- | --- | --- | --- |
| PVC 385° | Acetal copolymer 360° | PVC 385° | 370° |
| Styrene butadiene 300° | Urea amino 260° | Polyethylene 300° | 275° |
| Styrene butadiene 410° | PVC/ABS 390° | Styrene butadiene 410° | 400° |

An advantage of the invention resides in the fact that the spaced reinforcements of the reinforcing layer are formed as an incident to the molding of the hose and this reduces the handling required in the manufacture of the hose.

In accordance with the present invention the tube 10 comprises the three basic layers—the inner layer 11, the outer layer 12 and the intermediate or reinforcing layer 13. As shown in FIG. 1, the tube is inserted into a cavity 14 of a multipart heated mold 15, 15a having a corrugated wall 16 in the cavity and pressure is applied to the interior of the heated tube to cause the material of the tube to be pressed outwardly against the corrugated wall. While an expanding mandrel or an air bag may be used, as herein illustrated the pressure fluid is applied directly into the interior of the tube. It will be noted that the cover layer and the inner layer which are moved toward one another under this action by the crests of the corrugations of the wall and bonded together will cause the flowable material of the reinforcing layer to move to form reinforcing elements accurately located in the corrugations of the hose.

Figure 3:
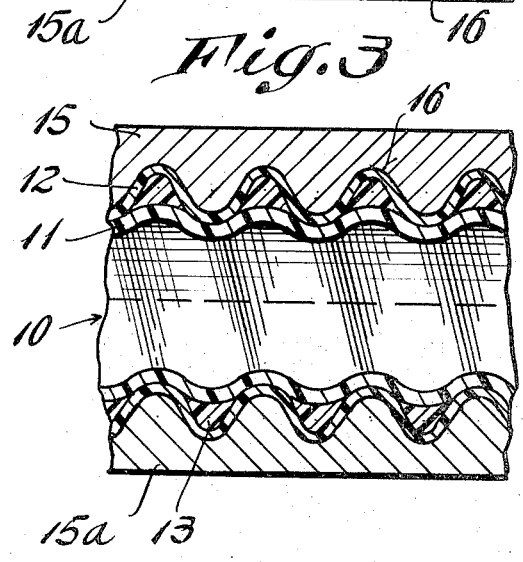
FIG. 3 is a view similar to FIG. 2 with the hose in fully molded condition.

FIG. 3 shows the finished molded hose with the reinforcement material being disposed in the spaced positions in the corrugations and the cover and inner layer secured together at the troughs of the molded hose. The hose is then set in its molded condition and is thereafter removed from the mold. If the material is thermosetting, it is heated for a sufficient time to completely set or cure the hose before it is cooled and removed from the mold and if it is thermoplastic the hose is cooled to set it in its molded form before the hose is removed from the mold.

Figure 4:
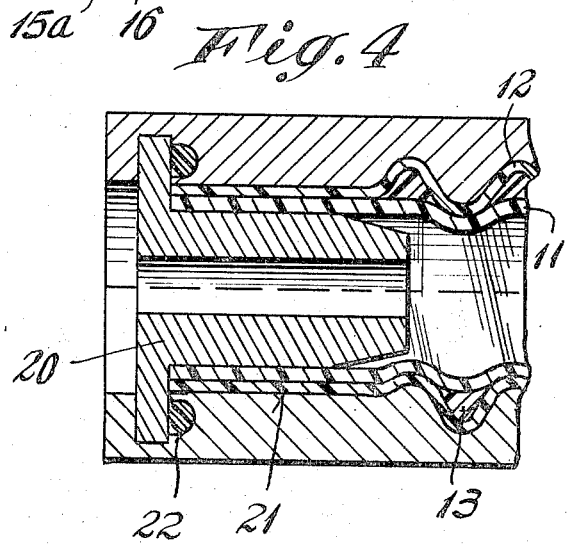
FIG. 4 is a fragmentary sectional view showing the formation of the end of a hose.

In cases where the hose is made of a predetermined length and it is desired to mold a mounting sleeve integral therewith, this can be accomplished by a plug 20 inserted in the end of the tube, as shown in FIG. 4, and cooperating with the cylindrical end section 21 of the mold to produce the cylindrical mounting sleeve on the hose. It will be noted that the excess of the reinforcing material is permitted to flow out and into the recesses 22 when it becomes flowable under the molding heat.

If desired, the present invention is capable of producing molded hose in indefinite lengths. An apparatus for accomplishing this is diagrammatically shown in FIG. 5 in which a fixed core or mandrel 30 passes through three extrusion heads 31, 32, 33 and into a molding unit disposed in a heating station 34 and a curing station 35 shown diagrammatically. The molding unit comprises a pair of opposed conveyors 36, 36' each having a plurality of mold sections 37, preferably hinged together as shown at H in FIG. 7 and movable in closed paths in the directions of arrow A (FIG. 5) into cooperating molding relation about the tube to move therewith as it emerges from the extruder.

In the illustrated form of the invention an extrusion head 31 extrudes the inner layer 11 on the mandrel, which layer moves through the second extrusion head 32 which extrudes the layer 13 of reinforcing material into a second layer over the inner layer, and the combination is fed through a third extrusion head 33 which extrudes the outer layer 12.

The tube 10 of concentric layers is fed along the fixed mandrel or core 30 and onto the molding extension 38 secured to the end of the fixed mandrel and which extends into the molding area. The end of the core carries a head 39 having passages 40 to permit the injection of molding pressure within the heated tube to cause the tube to be expanded outwardly progressively, as shown in FIGS. 5, 7 and 8, where it is completely molded. If desired, a valve 41 on the end of the extension (FIG. 9) seals off the pressure and the ports 42 and bore 43 provide a return flow for the pressure medium.

The molded tube continues as a molded hose with the spaced reinforcing elements, through the curing station and the set hose is discharged at the other end of the closed loops of the molds as shown in FIG. 5.

The discharged hose can be stored in any suitable manner and the required length of hose removed therefrom when desired.

It will be seen from the foregoing that the present novel invention in a single molding operation provides an all plastic corrugated flexible hose of elastomeric material having spaced reinforcing elements therein accurately located with respect to the corrugations and capable of serving as reinforcements for the hose under normal temperatures of use.

Variations and modifications may be made within the scope of the claims and portions of the improvements may be used without others.

I claim:

1. The method of making a self-reinforced corrugated hose of thermoformable elastomeric material without the necessity of incorporating non-elastomeric reinforcement materials comprising the steps of forming a tubular member by extruding an inner tubular layer consisting essentially of elastomeric material, extruding a tubular reinforcing layer consisting essentially of elastomeric material over said inner layer, and extruding a tubular cover layer consisting essentially of elastomeric material over said reinforcing layer, the material of the reinforcing layer having a flow temperature lower than the material of the inner layer and the cover layer, inserting said tubular member into a mold having a cavity provided with a corrugated wall, heating said tubular member to a molding temperature above the flow temperature of the reinforcing layer and lower than the flow temperature of the inner layer and the cover layer, applying internal pressure to the tubular member to force the cover layer of the tubular member into conforming engagement with the corrugated mold wall to mold the exterior of the hose, said pressure being sufficient to cause portions of the flowable reinforcing layer to be displaced into the troughs in the cover layer produced by the corrugations of the mold, and to cause the cover layer and inner layer to engage and adhere together over the crests of the corrugations of the mold, and setting the hose as molded in a single molding operation, said reinforcing layer forming accurately and uniformly spaced resilient reinforcing portions conforming to the corrugations of the mold and disposed between said inner layer and said cover layer.

2. The method according to claim 1 in which said tubular member is formed by extruding said inner tubular layer, said tubular reinforcing layer and said tubular cover layer in a triple extruder.

3. The method according to claim 1 in which each of said layers consists essentially of a polyvinyl chloride elastomer.

4. The method according to claim 3 in which said molding temperature is about 370° F.

5. A continuous molding method according to claim 1 in which reinforced corrugated hose of continuous length is molded and subsequently cut into hoses having the desired lengths.

6. A self-reinforced, extruded, corrugated hose produced according to the method of claim 1.

7. A self-reinforced, extruded, corrugated hose produced according to the method of claim 2.

* * * * *